US011225125B2

(12) United States Patent
Ito et al.

(10) Patent No.: US 11,225,125 B2
(45) Date of Patent: Jan. 18, 2022

(54) INTEGRATED VALVE DEVICE

(71) Applicant: DENSO CORPORATION, Kariya (JP)

(72) Inventors: Tetsuya Ito, Kariya (JP); Masaaki Kawakubo, Kariya (JP); Daiki Kato, Kariya (JP); Ryohei Sugimura, Kariya (JP); Yasuhiro Kawase, Nisshin (JP)

(73) Assignee: DENSO CORPORATION, Kariya (JP)

( * ) Notice: Subject to any disclaimer, the term of this patent is extended or adjusted under 35 U.S.C. 154(b) by 60 days.

(21) Appl. No.: 16/774,469

(22) Filed: Jan. 28, 2020

(65) Prior Publication Data
US 2020/0156444 A1 May 21, 2020

Related U.S. Application Data

(63) Continuation of application No. PCT/JP2018/024597, filed on Jun. 28, 2018.

(30) Foreign Application Priority Data

Jul. 31, 2017 (JP) .............................. JP2017-148297

(51) Int. Cl.
*B60H 1/32* (2006.01)
*F16K 11/14* (2006.01)

(52) U.S. Cl.
CPC ....... *B60H 1/3229* (2013.01); *B60H 1/32281* (2019.05); *F16K 11/14* (2013.01)

(58) Field of Classification Search
CPC .............. B60H 1/3229; B60H 1/32281; B60H 1/00485; B60H 2001/00171; B60H 2001/3267; B60H 2001/3297; G05D 23/02; F16K 11/14; F16K 11/16; F16K 11/161; F16K 11/00; F16K 11/02; F16K 11/027; F16K 11/04; F16K 11/044; F16K 11/06;
(Continued)

(56) References Cited

U.S. PATENT DOCUMENTS 3,650,287 A * 3/1972 Greenawalt ............. F25B 41/26
137/106
5,564,458 A * 10/1996 Roth ................... B60H 1/00485
137/115.06
(Continued)

FOREIGN PATENT DOCUMENTS

CN 203604722 U 5/2014
JP 2002188732 A 7/2002
(Continued)

*Primary Examiner* — Jianying C Atkisson
*Assistant Examiner* — Miguel A Diaz
(74) *Attorney, Agent, or Firm* — Harness, Dickey & Pierce, P.L.C.

(57) ABSTRACT

An integrated valve includes a body portion, a flow rate adjustment valve body, a flow passage switching valve body, and a shaft member. The body portion has formed therein a plurality of passages. The flow rate adjustment valve body is provided inside the body portion that adjusts a flow rate of fluid. The flow passage switching valve body is provided inside the body portion configured to switch a flow path of the predetermined fluid in the fluid circulation circuit, the flow passage switching valve body being switchable between distinct communication states. The shaft member is provided inside the body portion that interlocks the flow rate adjustment valve body and the flow passage switching valve body.

8 Claims, 10 Drawing Sheets

(58) Field of Classification Search
CPC ... F16K 11/065; F16K 11/048; F16K 11/0716
See application file for complete search history.

(56) References Cited

U.S. PATENT DOCUMENTS

| | | | |
|---|---|---|---|
| 8,250,874 | B2 | 8/2012 | Ikegami et al. |
| 10,520,231 | B2 * | 12/2019 | Itou ........................ F25B 41/26 |
| 10,899,196 | B2 * | 1/2021 | Kawakubo ......... B60H 1/00335 |
| 2002/0020180 | A1 * | 2/2002 | Takano ................ F25B 29/003 62/196.4 |
| 2007/0095098 | A1 * | 5/2007 | Lee .................... B60H 1/00485 62/527 |
| 2015/0217627 | A1 * | 8/2015 | Kang ..................... F25B 41/20 62/324.6 |
| 2016/0185185 | A1 | 6/2016 | Suzuki et al. |
| 2017/0102722 | A1 * | 4/2017 | Himmelmann ....... F04D 27/004 |
| 2018/0195780 | A1 * | 7/2018 | Itou .................... B60H 1/32281 |
| 2019/0118615 | A1 * | 4/2019 | Kawakubo ......... B60H 1/00885 |
| 2020/0200196 | A1 * | 6/2020 | Bacchiega ............ F15B 13/024 |

FOREIGN PATENT DOCUMENTS

| | | | | | |
|---|---|---|---|---|---|
| JP | | 4803199 | B2 | 10/2011 | |
| JP | | 2011235753 | A * | 11/2011 | ......... B60H 1/00485 |
| JP | | 2012082908 | A * | 4/2012 | |
| JP | | 2014213765 | A | 11/2014 | |
| WO | WO-2016063441 | A1 * | 4/2016 | .............. F25B 43/00 |
| WO | WO-2017022378 | A1 | 2/2017 | |

* cited by examiner

INTEGRATED VALVE DEVICE

CROSS REFERENCE TO RELATED APPLICATIONS

The present application is a continuation application of International Patent Application No. PCT/JP2018/024597 filed on Jun. 28, 2018, which designated the U.S. and claims the benefit of priority from Japanese Patent Application No. 2017-148297 filed on Jul. 31, 2017. The entire disclosures of all of the above applications are incorporated herein by reference.

TECHNICAL FIELD

The present disclosure relates to an integrated valve device in which a plurality of valve mechanisms are integrated.

BACKGROUND

Conventionally, a fluid circulation circuit in which a fluid circulates requires a plurality of valve mechanisms. For example, a refrigeration cycle apparatus may include a plurality of control valves for controlling the flow rate and flow path of a refrigerant. Such conventional systems are subject to improvement with respect to compactness, efficiency, or cost, for example by reducing the number of individual control valves.

SUMMARY

According to one aspect of the present disclosure, an integrated valve includes a body portion having formed therein a first inlet passage and a second inlet passage into which the predetermined fluid flows, and a first outlet passage, a second outlet passage and a third outlet passage through which the predetermined fluid flows out, a flow rate adjustment valve body provided inside the body portion that adjusts a flow rate of fluid flowing from the first inlet passage to the first outlet passage, a flow passage switching valve body provided inside the body portion configured to switch a flow path of the predetermined fluid in the fluid circulation circuit, the flow passage switching valve body being switchable between a first communication state that allows communication between the second inlet passage and the second outlet passage while closing the third outlet passage, and a second communication state that allows communication between the second inlet passage and the third outlet passage while closing the second outlet passage, and a shaft member provided inside the body portion that interlocks the flow rate adjustment valve body and the flow passage switching valve body.

DETAILED DESCRIPTION

Figure 1:
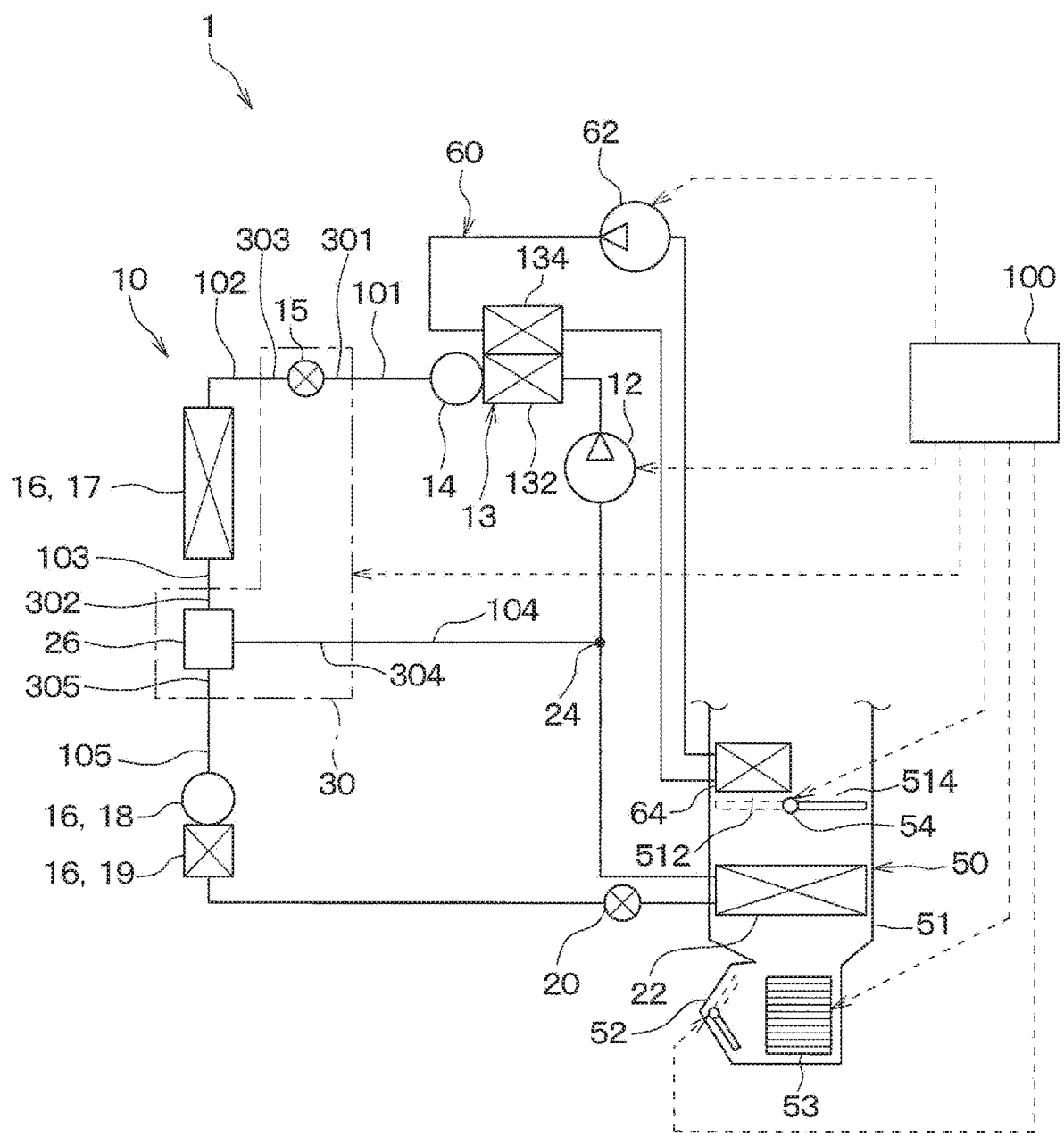
FIG. 1 is a diagram showing the entire configuration of a vehicle air conditioner according to a first embodiment.

Hereinafter, embodiments of the present disclosure will be described with reference to the drawings. In each embodiment described below, same or equivalent parts are designated with the same reference numerals.

First Embodiment

As shown in FIG. 1, in the present embodiment, an integrated valve device 30 of the present disclosure is applied to a heat pump circuit 10 of a vehicle air conditioner 1. The vehicle air conditioner 1 includes the heat pump circuit 10, an inside air conditioning unit 50, and a controller 100.

The vehicle air conditioner 1 is mounted on a hybrid vehicle or the like that obtains driving force for propulsion from an internal combustion engine and a propulsion electric motor (not shown). Compared with a vehicle that obtains vehicle propulsion driving force using only an internal combustion engine, hybrid vehicles and electric vehicles have less waste heat in the vehicle, and it is difficult to secure a heat source for heating the vehicle interior. For this reason, the vehicle air conditioner 1 of the present embodiment is configured to heat the vehicle interior with the inside air conditioning unit 50 using the high-temperature and high-pressure refrigerant discharged from a compressor 12 of the heat pump circuit 10 as a heat source.

The heat pump circuit 10 is a fluid circulation circuit in which a refrigerant circulates as a predetermined fluid. The heat pump circuit 10 forms a heat pump cycle. More specifically, the heat pump circuit 10 uses an HFC refrigerant (for example, R134a) as a refrigerant, and forms a vapor compression subcritical refrigeration cycle in which the high-pressure side refrigerant pressure does not exceed the refrigerant critical pressure. Of course, as the refrigerant, an HFO refrigerant (for example, R1234yf), carbon dioxide, or the like may be used instead.

The heat pump circuit 10 is configured to be switchable between a cooling mode refrigerant circuit that cools the air blown into the vehicle interior to cool the vehicle interior, and a heating mode refrigerant circuit that heats the air blown into the vehicle interior to heat the vehicle interior. In the present embodiment, the air blown into the passenger compartment is referred to as a temperature adjustment target fluid. Further, in the present embodiment, the cooling mode corresponds to a mode for cooling the temperature adjustment target fluid, and the heating mode corresponds to a mode for heating the temperature adjustment target fluid.

The heat pump circuit 10 includes a compressor 12, a water-refrigerant heat exchanger 13, a heating reservoir 14, an outside heat exchanger 16, a cooling expansion valve 20, an evaporator 22, an integrated valve device 30, and the like.

The compressor 12 is disposed inside the vehicle hood. The compressor 12 is a device that sucks in a refrigerant, then compresses and discharges the refrigerant. The compressor 12 of this embodiment is an electric compressor that is driven by an electric motor (not shown). The compressor 12 has a refrigerant discharge capability that can be varied according to the rotation speed of the electric motor. The operation of the compressor 12 is controlled by a control signal output from the controller 100.

The water-refrigerant heat exchanger 13 includes a first heat exchange unit 132 through which high-pressure refrigerant discharged from the compressor 12 flows, and a second heat exchange unit 134 through which antifreeze liquid flows.

The water-refrigerant heat exchanger 13 is a radiator that dissipates heat from the refrigerant flowing through the first heat exchange unit 132 by exchanging heat with the antifreeze liquid flowing through the second heat exchange unit 134. The antifreeze liquid flowing through the second heat exchange unit 134 is heated by the refrigerant flowing through the first heat exchange unit 132.

Further, the second heat exchange unit 134 is provided in an antifreeze liquid circulation circuit 60 through which the antifreeze liquid flows. The antifreeze liquid circulation circuit 60 is provided with a circulation pump 62 for circulating the antifreeze liquid and a heater core 64 for dissipating heat from the antifreeze liquid. The operation of the circulation pump 62 is controlled by a control signal from the controller 100.

The heater core 64 is disposed in a heating air passage 512 formed in the air conditioning case 51 of the indoor air conditioning unit 50. The heater core 64 is a radiator that dissipates heats from the antifreeze flowing therein by exchanging heat with blown air that passes through the heating air passage 512. The blown air passing through the heating air passage 512 is heated by the antifreeze flowing through the heater core 64.

Therefore, the water-refrigerant heat exchanger 13 of the present embodiment functions as a radiator that indirectly dissipates heat from the high-pressure refrigerant discharged from the compressor 12 to the blown air via the antifreeze liquid and the heater core 64.

The heating reservoir 14 temporarily stores part of the refrigerant that flows out of the first heat exchange unit 132.

The integrated valve device 30 is a single valve device in which a heating expansion valve 15 and a three-way valve 26 are integrated. The integrated valve device 30 is a composite control valve in which the heating expansion valve 15 and the three-way valve 26 operate in conjunction with each other. The operation of the integrated valve device 30 is controlled by a control signal from the controller 100.

Figure 2:
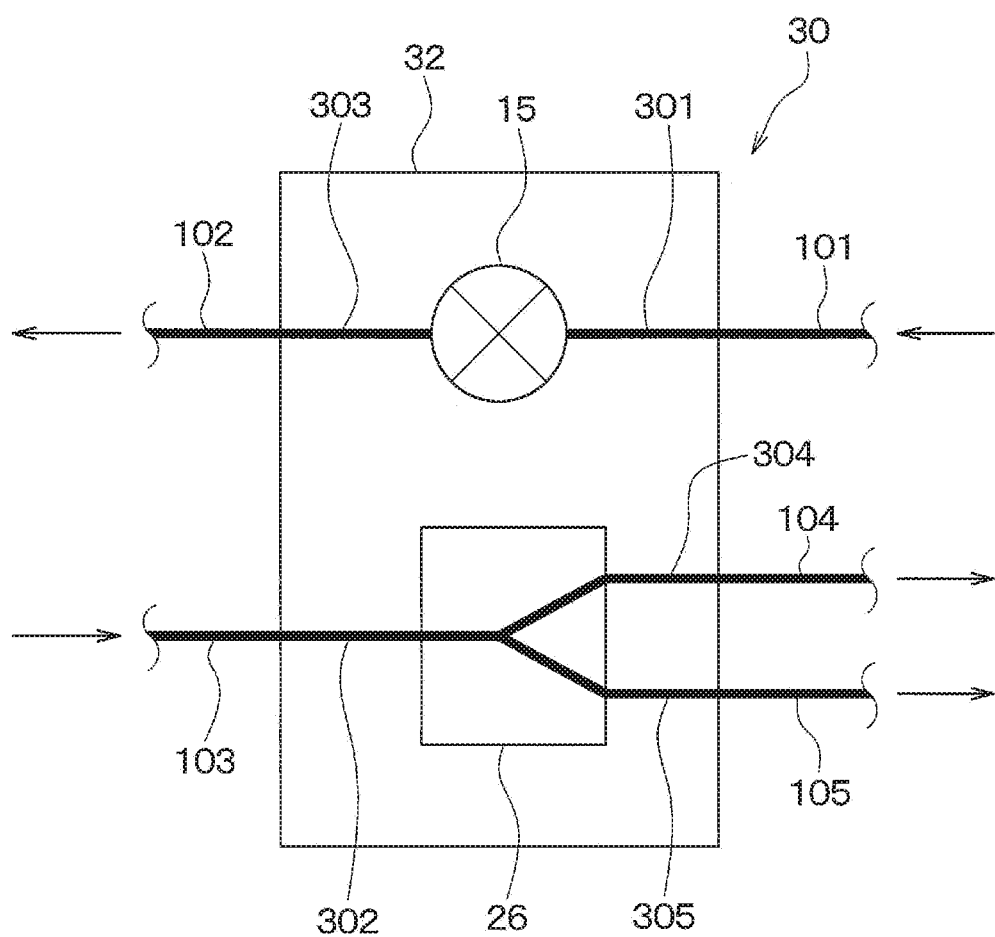
FIG. 2 is a schematic view of an integrated valve device in FIG. 1.

As shown in FIG. 2, the integrated valve device 30 includes a body portion 32, the heating expansion valve 15, and the three-way valve 26. The body portion 32 acts as a housing for various components and includes a plurality of refrigerant passages through which the refrigerant flows. Specifically, the body portion 32 includes a first inlet passage 301 and a second inlet passage 302 into which refrigerant flows, and a first outlet passage 303, a second outlet passage 304 and a third outlet passage 305 through which the refrigerant flows out.

The first inlet passage 301 is an inlet passage for the heating expansion valve 15. The first outlet passage 303 is an outlet passage of the heating expansion valve 15. The second inlet passage 302 is an inlet passage for the three-way valve 26. The second outlet passage 304 and the third outlet passage 305 are outlet passages for the three-way valve 26.

As shown in FIGS. 1 and 2, the first inlet passage 301 is connected to a flow passage 101 through which the refrigerant flowing out of the water-refrigerant heat exchanger 13 flows. The first outlet passage 303 is connected to a flow passage 102 that guides the refrigerant to a core portion 17. The second inlet passage 302 is connected to a flow passage 103 through which the refrigerant flowing out from the core portion 17 flows. The second outlet passage 304 is connected to a heating flow passage 104 that bypasses the liquid receiver 18, the subcooling unit 19, the cooling expansion valve 20, and the evaporator 22 and guides the refrigerant to the intake side of the compressor 12. The third outlet passage 305 is connected to a cooling flow passage 105 that guides the refrigerant, in order, to the liquid receiver 18, the subcooling unit 19, the cooling expansion valve 20, the evaporator 22, and finally to the intake side of the compressor 12. The detailed configuration of this integrated valve device will be described later.

The heating expansion valve 15 is a flow rate adjustment valve that adjusts the flow rate of the refrigerant flowing from the first inlet passage 301 to the first outlet passage 303. During the heating mode, the heating expansion valve 15 decompresses and expands the refrigerant flowing out of the heating reservoir 14. The three-way valve 26 selectively switches between the heating flow passage 104 and the cooling flow passage 105. Thus, the three-way valve 26 is a flow passage switching valve that switches the flow path of the refrigerant in the heat pump circuit 10.

The outside heat exchanger 16 is a heat exchanger arranged outside the passenger compartment so as to be exposed to air outside the passenger compartment (that is, outside air). The outside heat exchanger 16 includes the core portion 17, the liquid receiver 18, and the subcooling unit 19.

The core portion 17 is a heat exchanger that exchanges heat between the refrigerant and a heat medium other than the refrigerant. In this case, that heat medium is outside air. Depending on the temperature of the refrigerant and the outside air temperature, the core portion 17 may either function as a heat absorber that absorbs heat from the outside air or a heat radiator that dissipates heat into the outside air. During the cooling mode, the core portion 17 functions as a condenser that condenses the refrigerant by dissipating heat to the outside air. During the heating mode, the core portion 17 functions as an evaporator that evaporates the refrigerant by absorbing heat from outside air.

The liquid receiver 18 separates the refrigerant flowing out from the core portion 17 into liquid refrigerant and gas refrigerant. The liquid receiver 18 temporarily stores a portion of the separated liquid refrigerant as excess refrigerant in the refrigeration cycle.

The subcooling unit 19 is a heat exchanger that cools the liquid refrigerant stored in the liquid receiver 18 by exchanging heat with the outside air in the cooling mode.

During the cooling mode, the cooling expansion valve 20 decompresses and expands the refrigerant flowing out of the outside heat exchanger 16. The cooling expansion valve 20 of the present embodiment is a temperature type expansion valve in which the refrigerant that will into the evaporator 22 is decompressed and expanded by a mechanical mechanism such that the degree of superheating of the refrigerant on the refrigerant outlet side of the evaporator 22 falls within a predetermined range.

The evaporator 22 is connected to the refrigerant outlet side of the cooling expansion valve 20. The evaporator 22 is disposed in the air conditioning case 51 of the indoor air conditioning unit 50. Specifically, the evaporator 22 is disposed on the upstream side of the heater core 64 in the air flow direction. The evaporator 22 is a cooling heat exchanger that evaporates the low-pressure refrigerant decompressed by the cooling expansion valve 20 by exchange heat with the blown air and cooling the blown air. The refrigerant outlet side of the evaporator 22 is connected to the refrigerant intake side of the compressor 12.

Further, in the heat pump circuit 10 of the present embodiment, a merging portion 24 is defined between the evaporator 22 and the compressor 12. Specifically, the merging portion is where a refrigerant flow downstream side of the evaporator 22 and a refrigerant flow downstream side of the second outlet passage 304 of the integrated valve device 30 merge together.

Next, the inside air conditioning unit 50 will be described. The indoor air conditioning unit 50 is disposed inside an instrument panel at the front of the passenger compartment. The indoor air conditioning unit 50 has the air conditioning case 51 that forms an outer shell and an air passage for the blown air to be blown into the passenger compartment.

An inside/outside air switching device 52 is disposed on the upstream-most region of the air conditioning case 51 in the air flow direction. The inside/outside air switching device 52 may be a rotatable door, and is switchable between introducing vehicle compartment air (that is, inside air) and introducing outside air. A blower 53 that blows air introduced through the inside/outside air switching device 52 toward the passenger compartment is disposed on the downstream side of the inside/outside air switching device 52 in the air flow direction. The blower 53 is an electric blower. The rotation speed of the blower 53 is controlled by a control signal output from the controller 100 described later.

The evaporator 22 and the heater core 64 are arranged on the downstream side of the blower 53 in the air flow direction. The evaporator 22 and the heater core 64 are arranged in the order of the evaporator 22 and then the heater core 64 with respect to the flow of the blown air.

In the air conditioning case 51 of the present embodiment, a heating air passage 512 and a bypass passage 514 are defined downstream of the evaporator 22 in the air flow direction. The heater core 64 is disposed in the heating air passage 512. Further, the bypass passage 514 allows the blown air to bypass the heating air passage 512.

Further, an air mix door 54 is disposed in the air conditioning case 51. The air mix door 54 adjusts the air volume of the blown air flowing into the heating air passage 512 and the air volume of the blown air flowing into the bypass passage 514. The operation of the air mix door 54 is controlled by a control signal output from the controller 100 described later.

An opening hole (not shown) that allows communication with the passenger compartment, which is the air conditioning target space, is formed in the downstream-most portion of the air conditioning case 51 in the air flow direction. Air that has been temperature adjusted by the evaporator 22 and the heater core 64 is blown out into the passenger compartment through the opening hole (not shown).

Next, the controller 100 which is an electronic control unit of the vehicle air conditioner 1 will be described. The controller 100 includes a typical microcontroller that includes a CPU, ROM, RAM, and the like, as well as peripheral circuits of these components. Note that the storage units of the controller 100 are non-transitory storage medium.

The controller 100 performs various calculations and processing based on control programs stored in the ROM or the like to control the operation of various controllable devices connected to the output side of the controller 100. These controllable devices include the compressor 12, the integrated valve device 30, the circulation pump 62, the inside/outside air switching device 52, the blower 53, and the air mix door 54.

Here, the controller 100 may be defined as an integration of a plurality of control units that control the operations of the various controllable devices connected to the output side of the controller 100. For example, in this embodiment, the components (e.g., hardware, software) of the controller 100 that controls the operation of the integrated valve device 30 may be referred to as a drive control unit that drives the integrated valve device 30.

Figure 3:
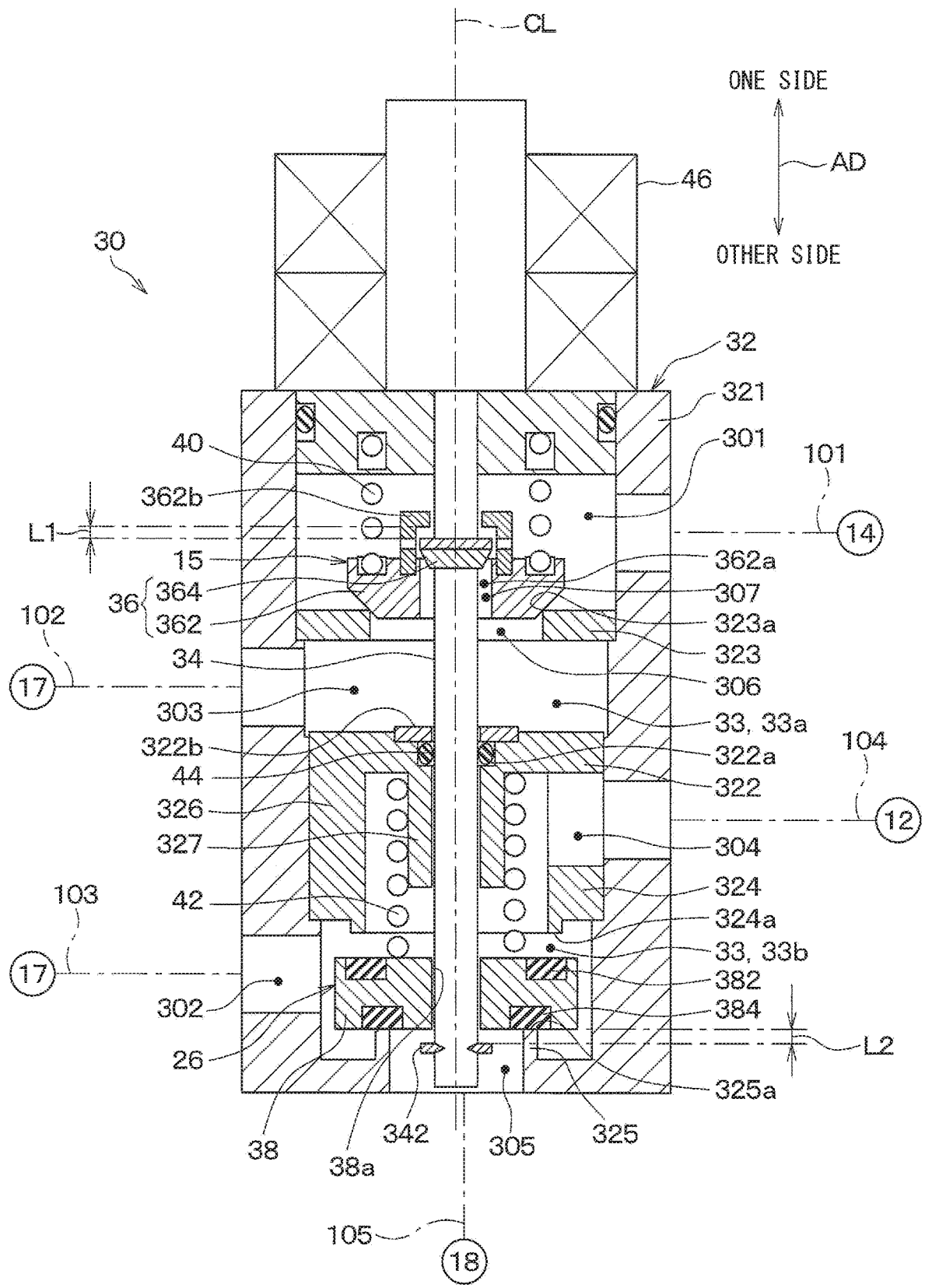
FIG. 3 is a schematic view of an integrated valve device in FIG. 1.

Next, the details of the integrated valve device 30 of the present embodiment will be described. As shown in FIG. 3, the integrated valve device 30 includes a body portion 32, a rod 34, a first valve body 36, a second valve body 38, a first biasing spring 40, a second biasing spring 42, and an actuator 46. An arrow AD shown in FIG. 3 is a direction extending along an axis CL of the rod 34 of the integrated valve device 30 (that is, the axial direction of the rod 34). For the rod 34 of the present embodiment, the axial center CL is along the up-down direction. For this reason, in the present embodiment, the axial direction AD of the rod 34 coincides with the vertical direction. One side of the axial direction AD corresponds to the upward side. The other side of the axial direction AD corresponds to the downward side.

The body portion 32 is formed of a metal material excellent in heat resistance and pressure resistance. An internal space 33 that defines refrigerant passages is formed in the body portion 32. Specifically, the body portion 32 includes a hollow portion 321, a partition portion 322, a first valve seat forming portion 323, a second valve seat forming portion 324, and a third valve seat forming portion 325.

The hollow portion 321 is a member having a hollow shape. The partition portion 322, the first valve seat forming portion 323, the second valve seat forming portion 324, and the third valve seat forming portion 325 are disposed inside the hollow portion 321.

The partition portion 322 partitions the internal space 33 into an upper space 33a and a lower space 33b. The upper space 33a is a space above the partition portion 322. The lower space 33b is a space below the partition portion 322. The partition portion 322 is a member separate from the hollow portion 321. The partition portion 322 is fixed to the hollow portion 321, e.g., by press fitting.

The first valve seat forming portion 323, the first valve body 36, and the first biasing spring 40 are provided in the upper space 33a. The first valve seat forming portion 323, the first valve body 36, and the first biasing spring 40 form the heating expansion valve 15. The first valve seat forming portion 323 corresponds to a flow rate valve seat forming portion. The first valve body 36 corresponds to a flow rate adjustment valve body. The first biasing spring 40 corresponds to a flow rate biasing member.

The first valve seat forming portion 323 forms a first valve seat 323a. The first valve seat 323a is a main valve body valve seat to which a main valve body 362 of the first valve body 36 comes in contact with and separates from. The first inlet passage 301 is formed above the first valve seat forming portion 323 in the upper space 33a. The first outlet passage 303 is formed below the first valve seat forming portion 323 in the upper space 33a. Therefore, the upper space 33a corresponds to a space on the first outlet passage side including the first outlet passage 303 in the body portion 32 partitioned by the partition portion 322.

The first valve seat forming portion 323 is formed with a passage communication hole 306 for communicating the first inlet passage 301 with the first outlet passage 303. The first valve seat forming portion 323 is a separate member from the hollow portion 321. The first valve seat forming portion 323 is fixed to the hollow portion 321 by press fitting or the like.

The first valve body 36 is disposed above the first valve seat forming portion 323. The first valve body 36 includes the main valve body 362 and a sub valve body 364.

The main valve body 362 contacts and separates from the first valve seat 323a. The main valve body 362 is not fixed to the rod 34. The main valve body 362 is formed with a first insertion hole 362a through which the rod 34 is inserted. The first insertion hole 362a has a hole diameter larger than the outer diameter of the rod 34 so that a gap passage 307, through which refrigerant flows, is formed between the inner wall surface of the first insertion hole 362a and the rod 34. Specifically, the first insertion hole 362a formed in the main valve body 362 has a larger diameter than a second insertion hole 38a formed in the second valve body 38.

The sub valve body 364 is a valve body that adjusts the opening area of the gap passage 307 while the main valve body 362 is in contact with the first valve seat 323a. The sub valve body 364 is fixed to the rod 34. For this reason, the sub valve body 364 is configured to be movable together with the rod 34. The sub valve body 364 has an outer diameter smaller than that of the main valve body 362. The sub valve body 364 is disposed on the upper side of the main valve body 362.

The sub valve body 364 also functions as a pressing portion that presses the main valve body 362 upward, that is, in the direction where the main valve body 362 separates from the first valve seat 323a. In order to displace the main valve body 362 away from the first valve seat 323a, the main valve body 362 has a sub valve contact portion 362b that contacts the sub valve body 364 when the rod 34 is moved upward. The sub valve contact portion 362b is connected to the main valve body 362. The sub valve contact portion 362b is a cylindrical member having a bottom on one side. An opening portion is formed in the side wall of the cylindrical member.

The first biasing spring 40 is disposed on the upper side of the main valve body 362. The first biasing spring 40 is a biasing member that biases the main valve body 362 downward, that is, in the direction where the main valve body 362 approaches the first valve seat 323a. The first biasing spring 40 is a coil spring.

The rod 34 moves from the lower side to the upper side, the sub valve body 364 contacts the sub valve contact portion 362b, and the sub valve body 364 pushes the sub valve contact portion 362b upward, so that the rod 34 biases the main valve body 362 upwards. As a result, the main valve body 362 separates from the first valve seat 323a. The first inlet passage 301 and the first outlet passage 303 are in communication with each other through the passage communication hole 306 as well as a gap 308 between the main valve body 362 and the first valve seat 323a. As a result, a flow rate adjustment passage between the first inlet passage 301 and the first outlet passage 303 is in an open state. In the open state, the gap 308 between the main valve body 362 and the first valve seat 323a and the passage communication hole 306 mainly constitute the flow rate adjustment passage. The open state is a state in which refrigerant is able to flow from the first inlet passage 301 to the first outlet passage 303 with substantially no pressure reduction of the refrigerant. In the open state, the opening area of the flow rate adjustment passage is set to a predetermined size.

The rod 34 moves from the upper side to the lower side, and the sub valve body 364 is separated from the sub valve contact portion 362b, so that the rod 34 is in a state of not biasing the main valve body 362. In this state, the first biasing spring 40 biases the main valve body 362 downward. As a result, the main valve body 362 contacts the first valve seat 323a, and the gap 308 between the main valve body 362 and the first valve seat 323a is closed. The first inlet passage 301 and the first outlet passage 303 are in communication with each other through the passage communication hole 306 and the gap passage 307. As a result, the flow rate adjustment passage between the first inlet passage 301 and the first outlet passage 303 is in a throttled state. In the throttled state, the gap passage 307 and the passage communication hole 306 constitute the flow rate adjustment passage. The throttled state is a state in which the opening area of the flow rate adjustment passage is smaller than in the open state. That is, the throttled state is a state in which the flow of refrigerant from the first inlet passage 301 to the first outlet passage 303 is more restricted as compared to during the open state. In this throttled state, as the rod 34 moves from the upper side to the lower side, the sub valve body 364 reduces the opening area of the gap passage 307.

As described above, the first valve body 36 is in the open state when the rod 34 moves upward and the main valve body 362 is separated from the first valve seat 323a. Further, the first valve body 36 is in the throttled state when the rod 34 moves downward and the main valve body 362 contacts the first valve seat 323a. The throttled state applies a depressurizing effect on the refrigerant. In other words, the first valve body 36 is configured to be switchable between the open state and the throttled state.

Further, during the throttled state, the first valve body 36 can adjust the opening area of the gap passage 307 to a desired size by changing the position of the sub valve body 364. In this regard, during the throttled state, the first valve body 36 can reduce the pressure of the refrigerant that will flow out of the first outlet passage 303 to a desired pressure. In other words, the first valve body 36 is configured to be able to adjust the flow rate of the refrigerant during the throttled state.

In the present embodiment, the sub valve body 364 is positioned to finely adjust the passage opening degree of the gap passage 307. As a result, it is possible to reduce the amount of driving force required to move the rod 34 as compared to the case where the passage opening is finely adjusted by the main valve body 362.

A second valve seat forming portion 324, a third valve seat forming portion 325, a second valve body 38, and a second biasing spring 42 are provided in the lower space 33b. The second valve seat forming portion 324, the third valve seat forming portion 325, the second valve body 38, and the second biasing spring 42 form the three-way valve 26. The second valve body 38 corresponds to a flow passage switching valve body. The second valve seat formation portion 324 corresponds to a switching valve seat forming portion positioned on the partition portion side of the flow passage switching valve body. The second biasing spring 42 corresponds to a switching biasing member.

The second outlet passage 304 is formed in the lower space 33b above the second valve seat forming portion 324.

Therefore, the lower space 33b corresponds to a space on the second outlet passage side including the second outlet passage 304 in the body portion 32 partitioned by the partition portion 322. The second inlet passage 302 is formed between the second valve seat forming portion 324 and the third valve seat forming portion 325 in the lower space 33b. The third valve seat forming portion 325 is formed with a passage communication hole that allows communication with the second inlet passage 302. This passage communication hole forms the third outlet passage 305.

The second valve seat forming portion 324 is disposed above the second valve body 38. The second valve seat forming portion 324 forms a second valve seat 324a. The second valve seat 324a comes into contact with and separates from the upper side of the second valve body 38, that is, the side of the second valve body 38 that faces the partition portion 322. The second valve seat 324a corresponds to a switching valve seat which contacts and separates from the side of the flow passage switching valve body that faces the partition portion. The second valve seat forming portion 324 is connected to the partition portion 322 via the connecting part 326. In the present embodiment, the second valve seat forming portion 324 is integrally formed together with the partition portion 322. Here, integrally formed refers to a member that is continuous and seamless.

The third valve seat forming portion 325 is disposed below the second valve body 38. The third valve seat forming portion 325 forms a third valve seat 325a. The third valve seat 325a comes into contact with and separates from the lower side of the second valve body 38, that is, the side of the second valve body 38 that faces away from the partition portion 322. The third valve seat forming portion 325 is integrally formed with the hollow portion 321.

The second valve body 38 is disposed between the second valve seat forming portion 324 and the third valve seat forming portion 325 in the axial direction AD. The second valve body 38 is provided with packings 382 and 384 on a portion that contacts the second valve seat 324a and a portion that contacts the third valve seat 325a, respectively. The second valve body 38 is not fixed to the rod 34. The second valve body 38 is formed with a second insertion hole 38a through which the rod 34 is inserted. The second insertion hole 38a has a hole diameter slightly larger than the outer diameter of the rod 34 such that a very small gap passage is formed between the rod 34 and the inner wall surface of the second insertion hole 38a. Here, a very small gap refers to a gap through which substantially no refrigerant flows.

The second biasing spring 42 is disposed above the second valve body 38. The second biasing spring 42 is a biasing member that biases the second valve body 38 downward, that is, in a direction in which the second valve body 38 closes the third outlet passage 305. The second biasing spring 42 is a coil spring. Due to being biased by the second biasing spring 42, the second valve body 38 comes into contact with the third valve seat 325a. As a result, the second inlet passage 302 is in communication with the second outlet passage 304 while the third outlet passage 305 is closed.

The second valve body 38 is configured to be pressed upward by a pressing portion 342 provided on the rod 34 against the biasing force of the second biasing spring 42. In this case, the second valve body 38 is urged upward, that is, in a direction to close the second outlet passage 304. When the second valve body 38 is urged upward, the second valve body 38 comes into contact with the second valve seat 324a.

As a result, the second inlet passage 302 is in communication with the third outlet passage 305 while the second outlet passage 304 is closed.

Further, when the pressing portion 342 is no longer pressing against the second valve body 38, the second valve body 38 is moved downward due to the biasing force of the second biasing spring 42. As a result, the second valve body 38 is set to a first communication state.

The rod 34 is a shaft member that interlocks the first valve body 36 and the second valve body 38. Here, interlock refers to the rod 34 being capable of displacing both the first valve body 36 and the second valve body 38 as will be explained below. The rod 34 moves along the axis CL to displace the first valve body 36 and the second valve body 38. The rod 34 is configured as a single rod-shaped member extending along the axis CL. The main valve body 362 and the second valve body 38 are attached to the rod 34. The rod 34 is integrally provided with the sub valve body 364 and the pressing portion 342 that presses the second valve body 38. The upper end of the rod 34 is connected to the actuator 46 and moves along the axial direction AD due the driving force output from the actuator 46.

The partition portion 322 is formed with a third insertion hole 322a through which the rod 34 is inserted. The integrated valve device 30 includes a sealing member 44 that seals a gap between the inner wall surface of the third insertion hole 322a and the rod 34 while allowing the rod 34 to slide. The sealing member 44 is a ring-shaped elastic member. The sealing member 44 is covered with a cover portion 322b provided on the upper side of the partition portion 322. The sealing member 44 can prevent the refrigerant flowing through the first outlet passage 303 from flowing into the second outlet passage 304 through a gap between the inner wall surface of the third insertion hole 322a and the rod 34.

The partition portion 322 has a cylindrical portion 327 extending from the peripheral portion of the third insertion hole 322a toward the three-way valve 26. The rod 34 is inserted inside the cylindrical portion 327. The cylindrical portion 327 supports the second biasing spring 42.

The actuator 46 is a drive unit that outputs a drive force to move the rod 34 along the axial direction AD. The actuator 46 of the present embodiment is a direct acting actuator that converts rotary motion into linear motion (that is, a sliding motion) and then outputs the linear motion.

Further, the actuator 46 of the present embodiment includes an electric motor that generates a rotational driving force when energized, a power conversion unit, and the like. The electric motor is formed of a stepper motor capable of controlling rotation angle in accordance with an input pulse signal. The power conversion unit is a mechanism that converts the rotational motion of an output shaft of the electric motor into linear motion to move the rod 34 in the axial direction AD.

Figure 4:
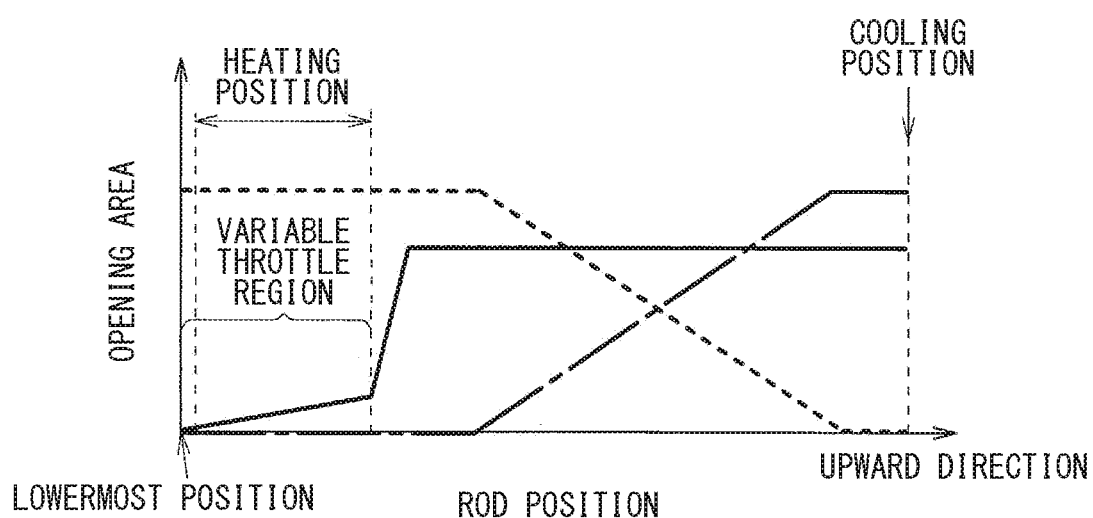
FIG. 4 is a diagram showing the relationship between a rod position and an opening area of each outlet passage in the integrated valve device of FIG. 3.

Here, FIG. 4 is a characteristic diagram showing a relationship between the opening areas of each of the first outlet passage 303, the second outlet passage 304, and the third outlet passage 305 in the integrated valve device 30 with respect to the position of the rod 34. In FIG. 4, changes in the opening area of the first outlet passage 303 is indicated by a solid line, changes in the opening area of the second outlet passage 304 is indicated by a dashed line, and changes in the opening area of the third outlet passage 305 is indicated by a one-dot-one-dash line. The opening area of the first outlet passage 303 is the passage sectional area of the flow rate adjustment passage adjusted by the first valve body 36. The opening areas of the second outlet passage 304 and the third outlet passage 305 are, respectively, the passage sectional areas of the second outlet passage 304 and the third outlet passage 305 adjusted by the second valve body 38. Each of the opening area of the first outlet passage 303, the second outlet passage 304, and the third outlet passage 305 is the effective passage cross-sectional area for the refrigerant flow.

As shown in FIG. 4, the integrated valve device 30 can adjust the opening areas of the first outlet passage 303, the second outlet passage 304, and the third outlet passage 305 by adjusting the position of the rod 34. A timing of when the rod 34 is at its lowest position corresponds to the state of the integrated valve device 30 shown in FIG. 3. A timing of when the rod 34 is at a heating position corresponds to the state of the integrated valve device 30 shown in FIG. 5. A timing of when the rod 34 is at a refrigerant position corresponds to the state of the integrated valve device 30 shown in FIG. 6.

Specifically, when the position of the rod 34 is at its lowermost position, as shown in FIG. 3, the pressing portion 342 of the rod 34 is separated from the second valve body 38. For this reason, the second biasing spring 42 biases the second valve body 38. The rod 34 does not bias the second valve body 38. Due to this, the second valve body 38 separates from the second valve seat 324a, and the second valve body 38 abuts the third valve seat 325a. As a result, the second outlet passage 304 is fully open and the third outlet passage 305 is fully closed. That is, as shown in FIG. 4, the opening area of the second outlet passage 304 is maximized, and the opening area of the third outlet passage 305 is zero. Therefore, as shown in FIG. 3, the second valve body 38 is in a first communication state in which the second inlet passage 302 is in communication with the second outlet passage 304 while the third outlet passage 305 is closed.

At this time, as shown in FIG. 3, the sub valve body 364 of the first valve body 36 is separated from the sub valve contact portion 362b. For this reason, the first biasing spring 40 biases the main valve body 362. The rod 34 does not bias the main valve body 362. Thereby, the main valve body 362 is in contact with the first valve seat 323a. Further, the sub valve body 364 is in abutment with the main valve body 362, and the gap passage 307 is closed. As a result, the first outlet passage 303 is fully closed. That is, as shown in FIG. 4, the opening area of the first outlet passage 303 is zero. At this time, since the first outlet passage 303 is fully closed, the circulation of the refrigerant in the heat pump circuit 10 is stopped.

Figure 5:
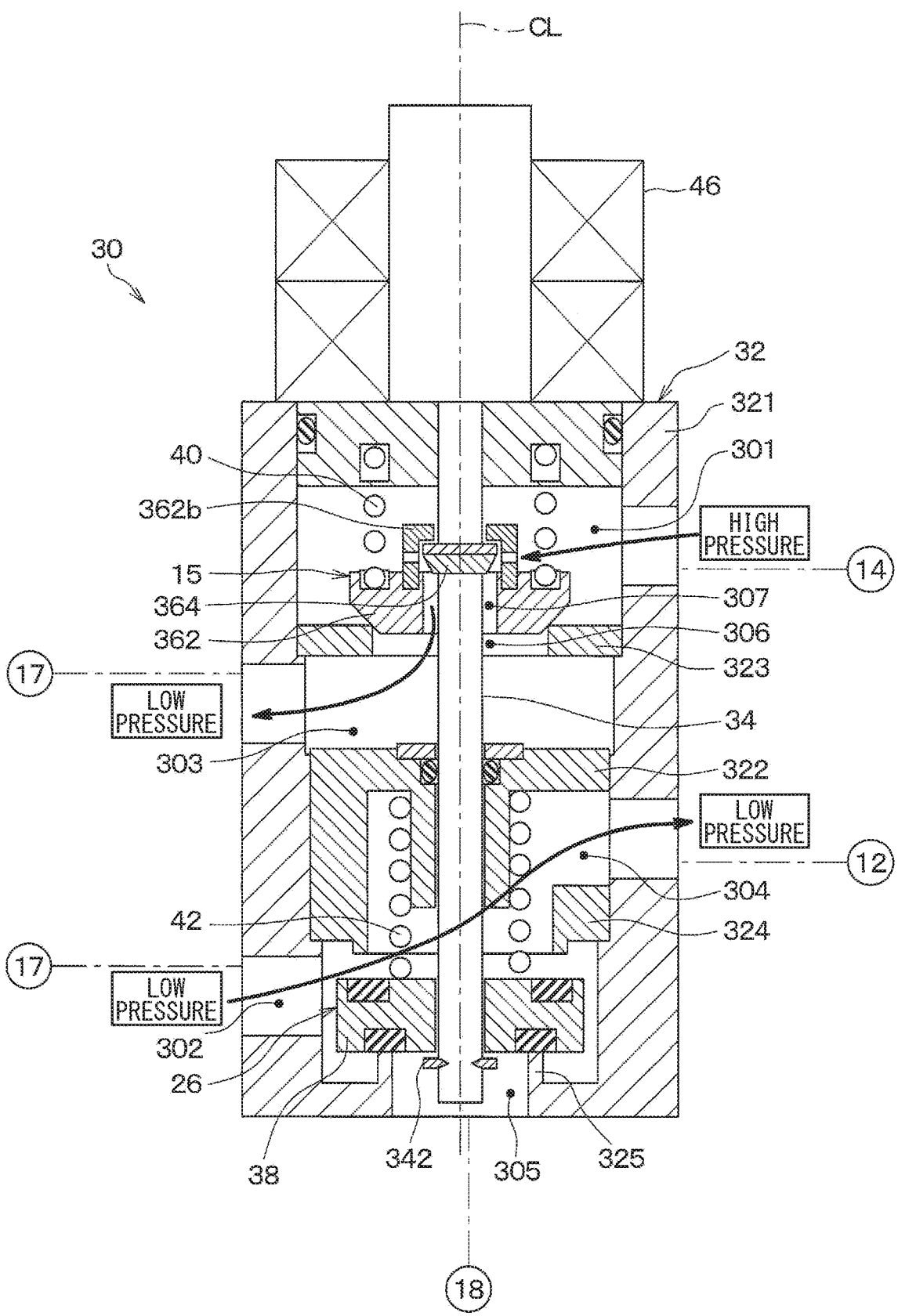
FIG. 5 is a cross-sectional view of the integrated valve device of the first embodiment in the heating mode.

When the rod 34 moves upward from the lowermost position, the position of the rod 34 reaches the heating position. At this time, as shown in FIG. 5, the pressing portion 342 of the rod 34 remains separated from the second valve body 38. For this reason, the second valve body 38 remains in the first communication state similar to during the lowermost position.

At this time, the sub valve body 364 of the first valve body 36 is separated from the main valve body 362. For this reason, the first inlet passage 301 and the first outlet passage 303 are in communication with each other through the gap passage 307 and the passage communication hole 306. Therefore, the refrigerant flowing from the first inlet passage 301 to the first outlet passage 303 may be decompressed to a desired pressure.

Further, the second biasing spring 42 biases the second valve body 38 while the rod 34 does not bias the second valve body 38. As a result, the second valve body 38 remains in the first communication state. For this reason, in the first communication state, the position of the rod 34 can be changed and the position of the sub valve body 364 can be finely adjusted. As a result, the opening area of the first outlet passage 303 can be changed in the in the variable throttle region shown in FIG. 4.

In this regard, when the position of the rod 34 is in the variable throttle region, the pressing portion 342 is separated from the second valve body 38. That is, the second biasing spring 42 biases the second valve body 38 while the rod 34 does not bias the second valve body 38. As a result, it is possible to retain the second valve body 38 in the first communication state. Then, when the second valve body 38 is in the first communication state, by biasing the sub valve body 364 of the first valve body 36 with the rod 34, the first valve body 36 is able to adjust the flow rate of the refrigerant.

Further, as shown in FIG. 3, when the position of the rod 34 is located on the lowermost side in the axial direction AD, the distance L2 between the pressing portion 342 and the second valve body 38 in the axial direction AD is equal to or greater than the distance L1 between the sub valve body 364 and the sub valve contact portion 362b in the axial direction AD. For this reason, when the position of the rod 34 is within the variable throttle region, which is a region in which the opening area of the first outlet passage 303 can be adjusted, the pressing portion 342 is in a state of being separated from the second valve body 38.

Figure 6:
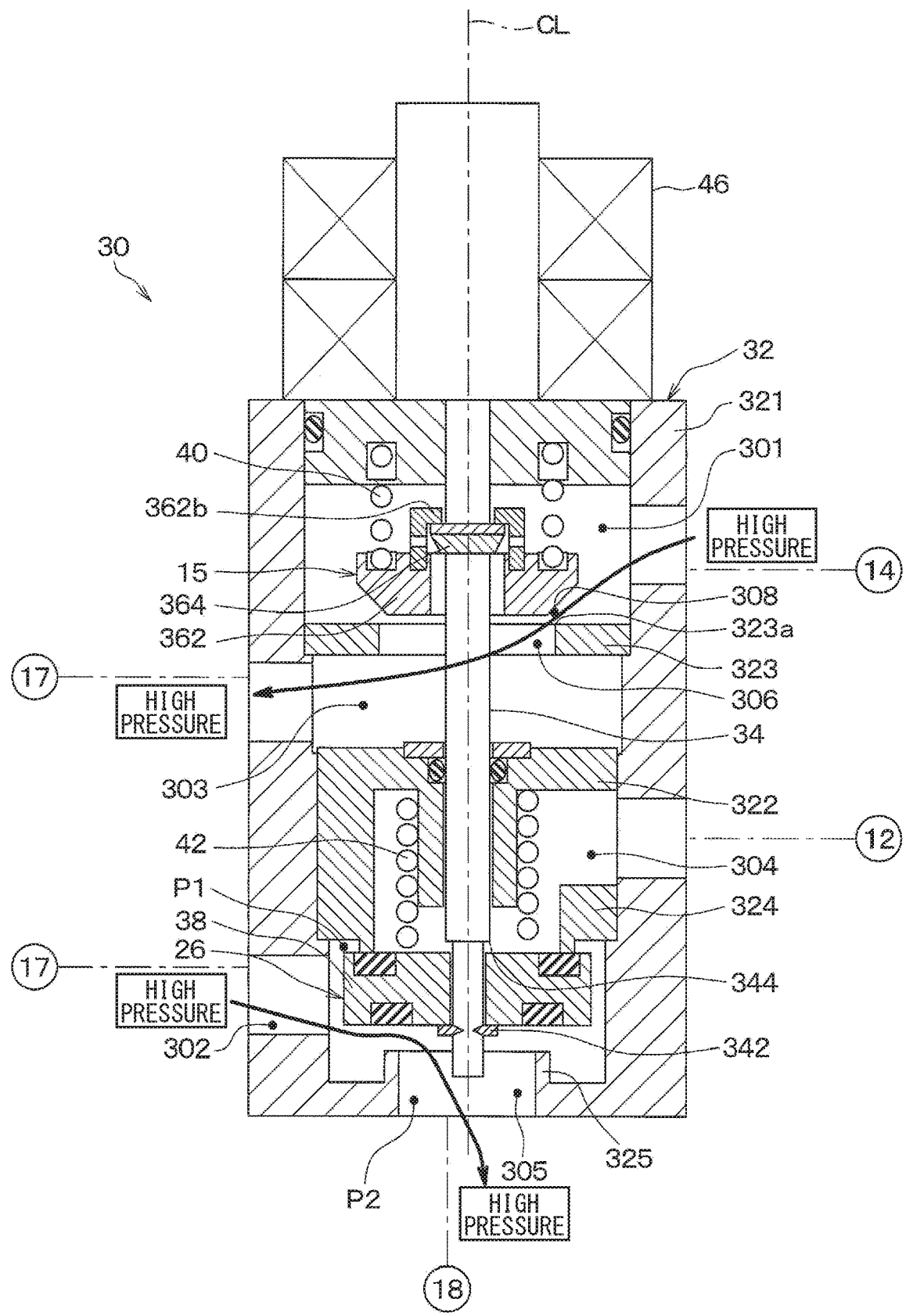
FIG. 6 is a cross-sectional view of the integrated valve device of the first embodiment in the cooling mode.

Further, as the rod 34 continues moving upward from the heating position, the position of the rod 34 eventually reaches the cooling position. At this time, as shown in FIG. 6, the pressing portion 342 of the rod 34 comes into contact with the second valve body 38. The rod 34 biases the second valve body 38 upwardly against the biasing force of the second biasing spring 42. Due to this, the second valve body 38 separates from the third valve seat 325a, and the second valve body 38 abuts the second valve seat 324a. As a result, the second outlet passage 304 is fully closed and the third outlet passage 305 is fully open. That is, as shown in FIG. 4, the opening area of the second outlet passage 304 is zero, and the opening area of the third outlet passage 305 is maximized. Therefore, as shown in FIG. 6, the second valve body 38 is in a second communication state in which the second inlet passage 302 is in communication with the third outlet passage 305 while the second outlet passage 304 is closed.

At this time, the sub valve body 364 of the first valve body 36 is abutting the sub valve contact portion 362b. The rod 34 biases the main valve body 362 upward. As a result, the main valve body 362 is separated from the first valve seat 323a. For this reason, the first inlet passage 301 and the first outlet passage 303 are in communication with each other through the passage communication hole 306 as well as the gap 308 between the main valve body 362 and the first valve seat 323a. Therefore, the refrigerant flowing from the first inlet passage 301 to the first outlet passage 303 flows into the core portion 17 of the outside heat exchanger 16 with substantially no pressure reduction.

As described above, the second valve body 38 can selectively switch between the first communication state and the second communication state by moving along the axial direction AD. The first valve body 36, by moving along the axial direction AD, can switch between an open state in which the refrigerant flows from the first inlet passage 301 to the first outlet passage 303, and a throttled state in which the refrigerant flowing from the first inlet passage 301 to the first outlet passage 303 is throttled as compared to the open state. Further, the first valve body 36 is able to adjust the flow rate of the refrigerant during the throttled state. In other words, the first valve body 36 is switchable between an open state and a variable throttle state.

Further, as shown in FIG. 4, both the movement direction of the rod 34 for switching the first valve body 36 from the variable throttle state to the open state, as well as the movement direction of the rod 34 for increasing the flow rate of refrigerant while the first valve body 36 is in the variable throttle state, are both in the upward direction. In other words, the direction for increasing the opening area of the first outlet passage 303 is the same as the movement direction of the rod 34 toward the one side of the axial direction AD.

For this reason, when compared to a case where the direction for increasing the opening area of the first outlet passage 303 is not the same as the movement direction of the rod 34 toward the one side of the axial direction AD, the control of the first valve body 36 is simplified. For example, in contrast to the present embodiment, consider a configuration where the movement direction of the rod 34 for switching the first valve body 36 from the variable throttle state to the open state is opposite to the movement direction of the rod 34 for increasing the flow rate of refrigerant while the first valve body 36 is in the variable throttle state. In this case, if the opening area of the first outlet passage 303 reduced too much while the first valve body 36 is in the variable throttle state, the first valve body 36 may unintentionally be set to the open state. In contrast, according to the present embodiment, when the first valve body 36 is in the variable throttle state, it is possible to avoid unintentionally opening the first valve body 36 caused by excessively reducing the opening area of the first outlet passage 303.

Next, the operation of the vehicle air conditioner 1 of the present embodiment will be described. The vehicle air conditioner 1 according to the present embodiment can switch the operation mode between the cooling mode and the heating mode due to the controller 100 controlling various devices. Next, the operations in the cooling mode and the heating mode for the vehicle air conditioner 1 will be described.

(Cooling Mode)

Figure 7:
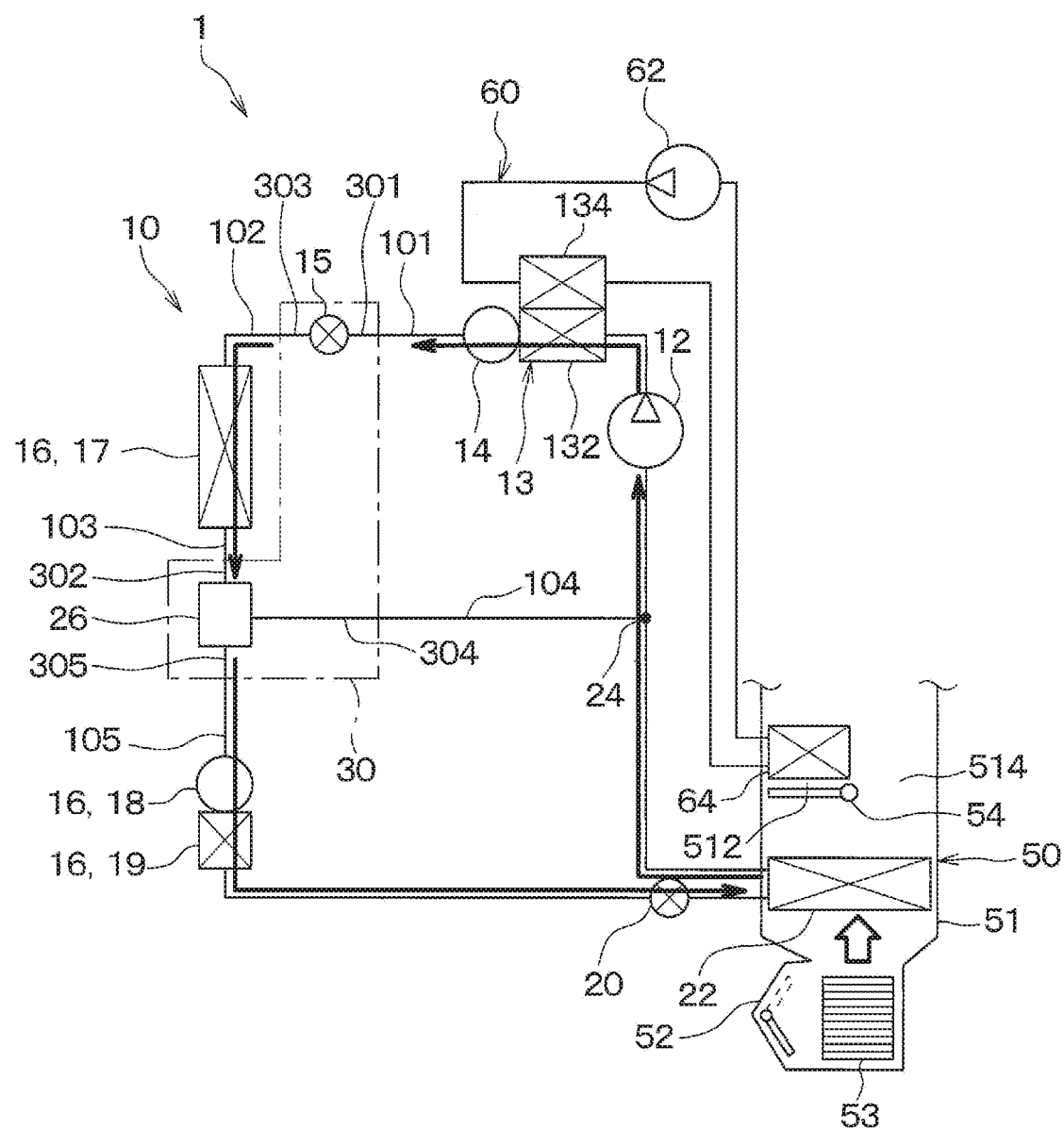
FIG. 7 is a diagram showing the vehicle air conditioner according to the first embodiment in a cooling mode.

When the operation mode is set to the cooling mode, as shown in FIG. 7, the controller 100 controls the air mix door 54 to be in a position where the bypass passage 514 is open. Due to this, the inside air conditioning unit 50 in the cooling mode is configured such that the entire flow of blown air passing through the evaporator 22 then passes through the bypass passage 514. Note that the controller 100 stops the circulation pump 62 so that the water-refrigerant heat exchanger 13 does not perform heat exchange between the refrigerant and the antifreeze liquid.

Further, the controller 100 controls the actuator 46 so that the position of the rod 34 is in the cooling position shown in FIG. 6. As a result, the heat pump circuit 10 acts as a cooling mode refrigerant circuit.

In the cooling mode refrigerant circuit, the high-pressure refrigerant discharged from the compressor 12 flows into the water-refrigerant heat exchanger 13. At this time, since the circulation pump 62 is stopped, in the water-refrigerant heat exchanger 13, the high-pressure refrigerant flows into the integrated valve device 30 substantially without exchanging heat with the antifreeze liquid.

As shown in FIG. 6, in the cooling mode, the heating expansion valve 15 is open. For this reason, the high-pressure refrigerant that flows into the first inlet passage 301 of the integrated valve device 30 subsequently flows out from the first outlet passage 303 with substantially no pressure reduction. The high-pressure refrigerant that flows out of the first outlet passage 303 then flows into the core portion 17 of the outside heat exchanger 16. The high-pressure refrigerant that flows into the core portion 17 radiates heat to outside air, and then flows into the second inlet passage 302 of the integrated valve device 30. In the cooling mode, the three-way valve 26 is in the second communication state. For this reason, the high-pressure refrigerant that flows into the second inlet passage 302 subsequently flows into the liquid receiver 18 through the third outlet passage 305.

As shown in FIG. 7, the high-pressure refrigerant that flows into the liquid receiver 18 is separated into a gas-phase refrigerant and a liquid-phase refrigerant. The liquid refrigerant stored in the liquid receiver 18 flows into the subcooling unit 19. The high-pressure refrigerant that flows into the subcooling unit 19 radiates heat to the outside air, and then flows into the cooling expansion valve 20 where it is decompressed into a low-pressure refrigerant. The refrigerant decompressed by the cooling expansion valve 20 flows into the evaporator 22, absorbs heat from the blown air to be blown into the passenger compartment, evaporates, and then is sucked into the compressor 12 again.

As described above, in the cooling mode, the blown air is cooled by the evaporator 22 of the heat pump circuit 10 and then blown into the vehicle interior without being heated by the heater core 64. As a result, cooling of the passenger compartment is performed.

(Heating Mode)

Figure 8:
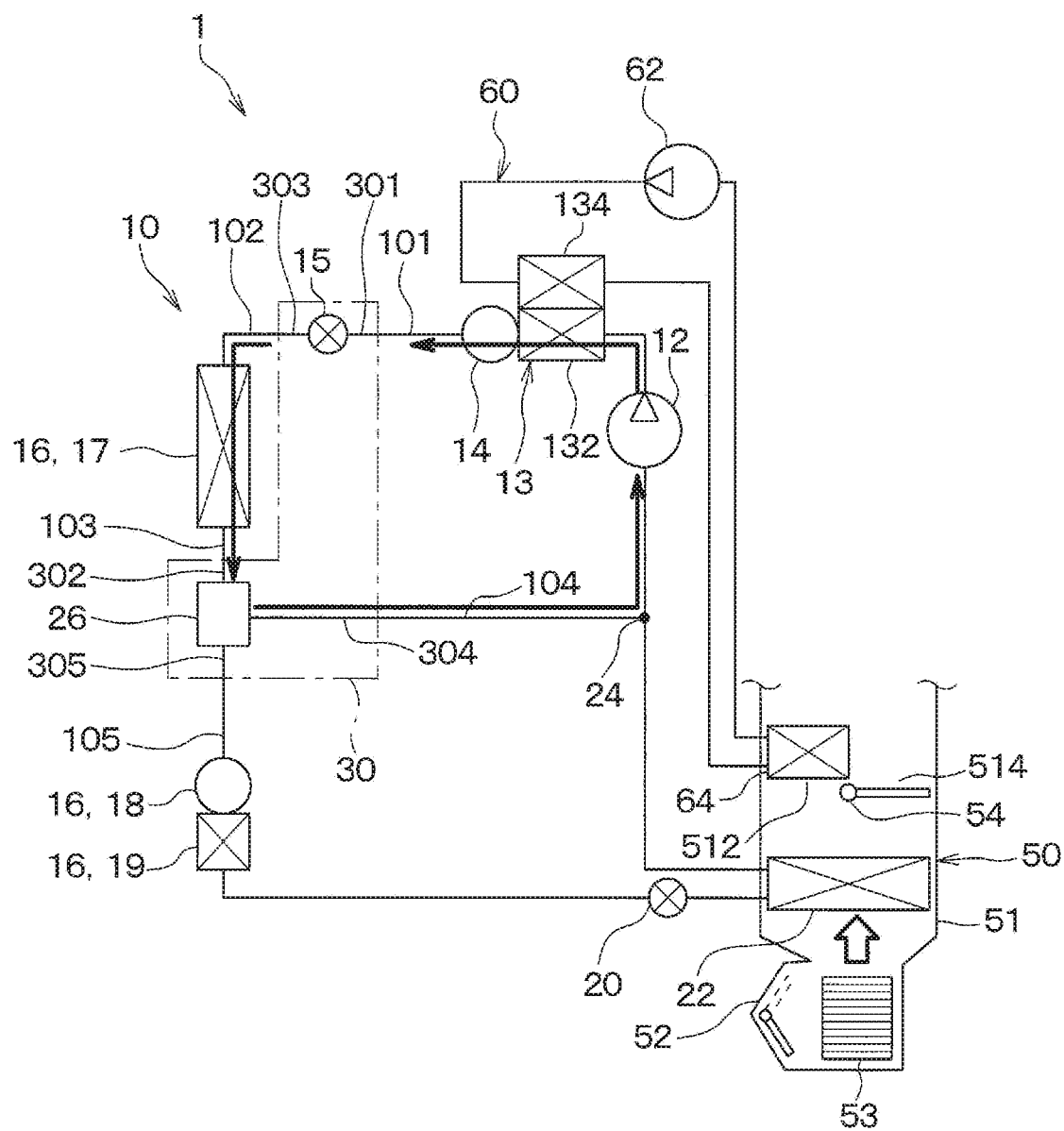
FIG. 8 is a diagram showing the vehicle air conditioner according to the first embodiment in a heating mode.

When the operation mode is set to the heating mode, as shown in FIG. 8, the controller 100 controls the air mix door 54 to be in a position where the bypass passage 514 is closed. Due to this, the inside air conditioning unit 50 in the heating mode is configured such that the entire flow of blown air passing through the evaporator 22 then passes through the heating air passage 512. Note that the controller 100 operates the circulation pump 62 so that the water-refrigerant heat exchanger 13 does perform heat exchange between the refrigerant and the antifreeze liquid.

Further, the controller 100 controls the actuator 46 so that the position of the rod 34 is in the heating position shown in FIG. 5. As a result, the heat pump circuit 10 acts as a heating mode refrigerant circuit.

In the heating mode refrigerant circuit, the high-pressure refrigerant discharged from the compressor 12 flows into the first heat exchange unit 132 of the water-refrigerant heat exchanger 13, and the heat of the high-pressure refrigerant passes through the antifreeze liquid and the heater core 64 to be dissipated into the blown air. The high-pressure refrigerant, which is heat dissipated by the water-refrigerant heat exchanger 13, is gas-liquid separated at the heating reservoir 14. Then, the liquid refrigerant separated in the heating liquid reservoir 14 flows into the integrated valve device 30.

As shown in FIG. 5, in the heating mode, the heating expansion valve 15 is in the variable throttle state. For this reason, the high-pressure refrigerant that flows into the first inlet passage 301 of the integrated valve device 30 subsequently flows out from the first outlet passage 303 after being decompressed into a low pressure refrigerant. At this time, the controller 100 adjusts the opening area of the first outlet passage 303 such that the degree of superheat of the refrigerant on the refrigerant suction side of the compressor 12 falls within a predetermined range.

The refrigerant that flows out of the first outlet passage 303 then flows into the core portion 17 of the outside heat exchanger 16. The refrigerant that flows into the core portion 17 absorbs heat from the outside air and evaporates. Then, the gas refrigerant evaporated in the core portion 17 flows into the second inlet passage 302 of the integrated valve device 30. In the heating mode, the three-way valve 26 is in the first communication state. For this reason, the low-pressure refrigerant flowing into the second inlet passage 302 subsequently flows out of the second outlet passage 305 and then flows through the heating flow passage 104.

As shown in FIG. 8, the gas refrigerant flowing out of the integrated valve device 30 flows to the refrigerant suction side of the compressor 12 via the heating flow passage 104 and is compressed again by the compressor 12.

As described above, in the heating mode, the blown air is indirectly heated by the heat of the high-pressure refrigerant in the heat pump circuit 10. Then, the blown air heated by the indoor air conditioning unit 50 is blown out into the passenger compartment. As a result, heating of the passenger compartment is performed.

To more clearly understand the advantages of the present embodiments, consider a comparative example refrigeration cycle apparatus having a heat pump circuit as the fluid circulation circuit in which a refrigerant circulates, in which the heat pump circuit can be switched between a cooling path and a heating path through which the refrigerant flows.

Specifically, the comparative example refrigeration cycle apparatus includes a condensation heat exchange unit, a subcooling heat exchange unit, and a liquid receiving unit that are configured as an integral unit and installed outside. Further, the comparative example refrigeration cycle apparatus has a large number of control valves for switching the refrigerant flow path in the heat pump circuit. For example, the comparative example refrigeration cycle apparatus includes, as one of its many control valves (i.e., valve mechanisms), a bypass pipe on-off valve provided in a bypass pipe that allows a refrigerant to flow so as to bypass the subcooling heat exchange section. The bypass pipe on-off valve opens the bypass pipe during heating (that is, during the heating operation mode) to allow the refrigerant to flow out from the liquid receiving unit and bypass the subcooling heat exchanger and the evaporator.

As described above, the comparative example refrigeration cycle apparatus can be switched between a cooling path and a heating path through which a refrigerant flows. However, the comparative example refrigeration cycle apparatus requires a large number of control valves for switching the path, and a switching operation is required for each of the control valves. This is not limited to the heat pump circuit, but is common to fluid circulation circuits having control valves (for example, valve mechanisms).

In contrast, as described in the present disclosure, the integrated valve device 30 of the present embodiment includes the body portion 32, the heating expansion valve 15, the three-way valve 26, and the rod 34. The heating expansion valve 15, the three-way valve 26 and the rod 34 are provided inside the body portion 32.

According to this, the heating expansion valve 15 having the first valve body 36 and the three-way valve 26 having the second valve body 38 are integrally provided. For this reason, as compared with the case where each control valve, i.e., the heating expansion valve 15 and the three-way valve 26, is provided separately, the number of control valves can be reduced. Further, according to this embodiment, the first valve body 36 and the second valve body 38 are mechanically interlocked by the rod 34. For this reason, as compared with the case where the first valve body 36 and the second valve body 38 are not mechanically interlocked, valve operation is advantageously simplified.

Second Embodiment

Figure 9:
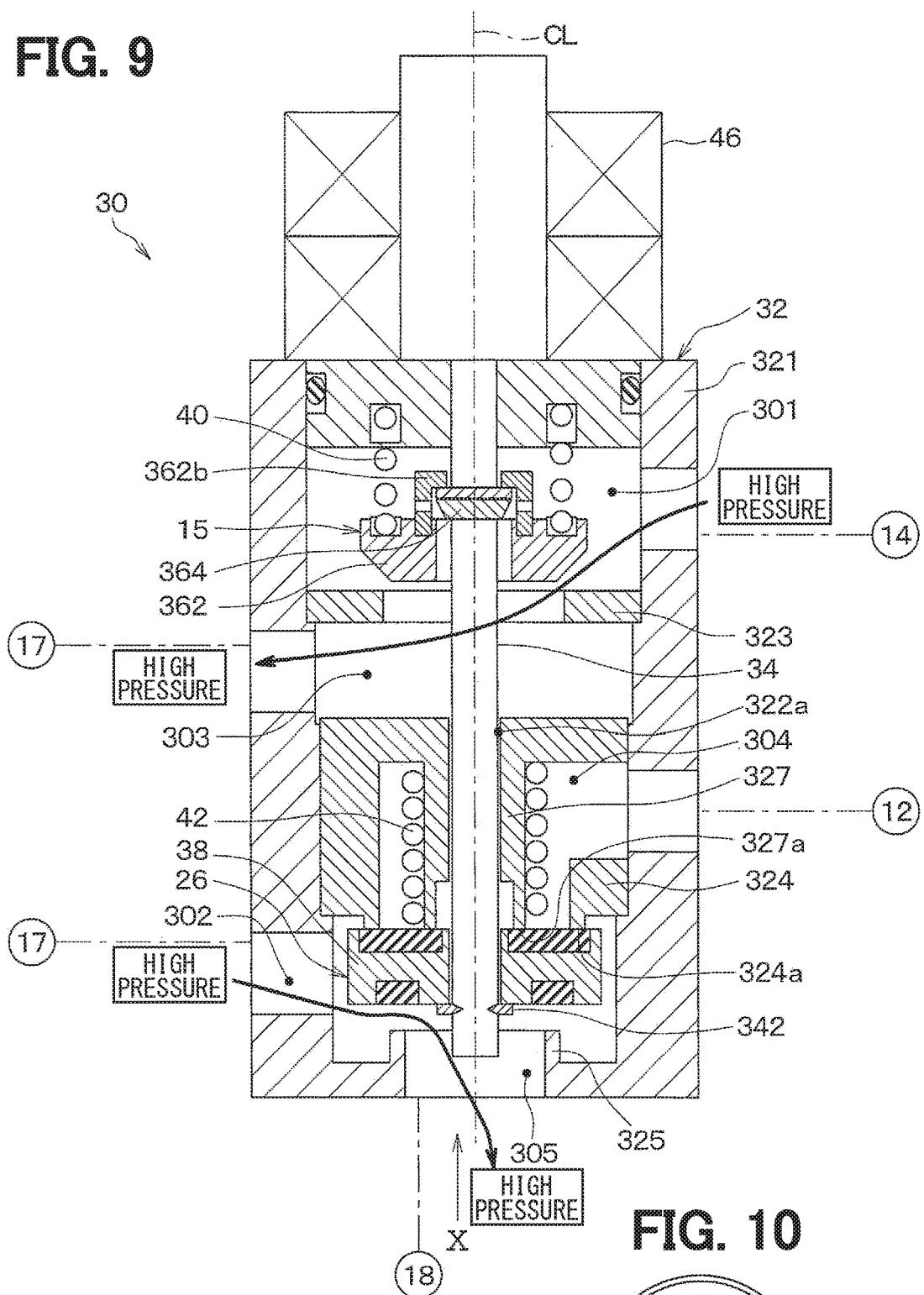
FIG. 9 is a cross-sectional view of the integrated valve device of a second embodiment in the cooling mode.

As shown in FIG. 9, the integrated valve device 30 of the present embodiment is different from the integrated valve device 30 of the first embodiment in that the position of the end portion 327a of the cylindrical portion 327 facing the second valve body 38 is different.

Figure 10:
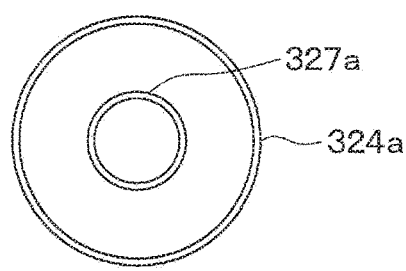
FIG. 10 is a view taken along the arrow X of the end of the cylindrical portion and the second valve seat in FIG. 9.

In the present embodiment, when the second valve body 38 contacts the second valve seat 324a and closes the second outlet passage 304, the end portion 327a of the cylindrical portion 327 is in a position to abut the second valve body 38. As shown in FIG. 10, the end portion 327a of the cylindrical portion 327 is annular and is located on the inner peripheral side of the second valve seat 324a. As a result, a two-layer annular valve seat that contacts the second valve body 38 is formed by the end portion 327a of the cylindrical portion 327 and the second valve seat 324a.

According to this, in the cooling mode, that is, when the second valve body 38 is in the second communication state in which the second outlet passage 304 is blocked, it is possible to prevent the high-pressure refrigerant flowing through the first outlet passage 303 from flowing into the second outlet passage 304 through the gap between the inner wall surface of the insertion hole 322a and the rod 34.

Figure 11:
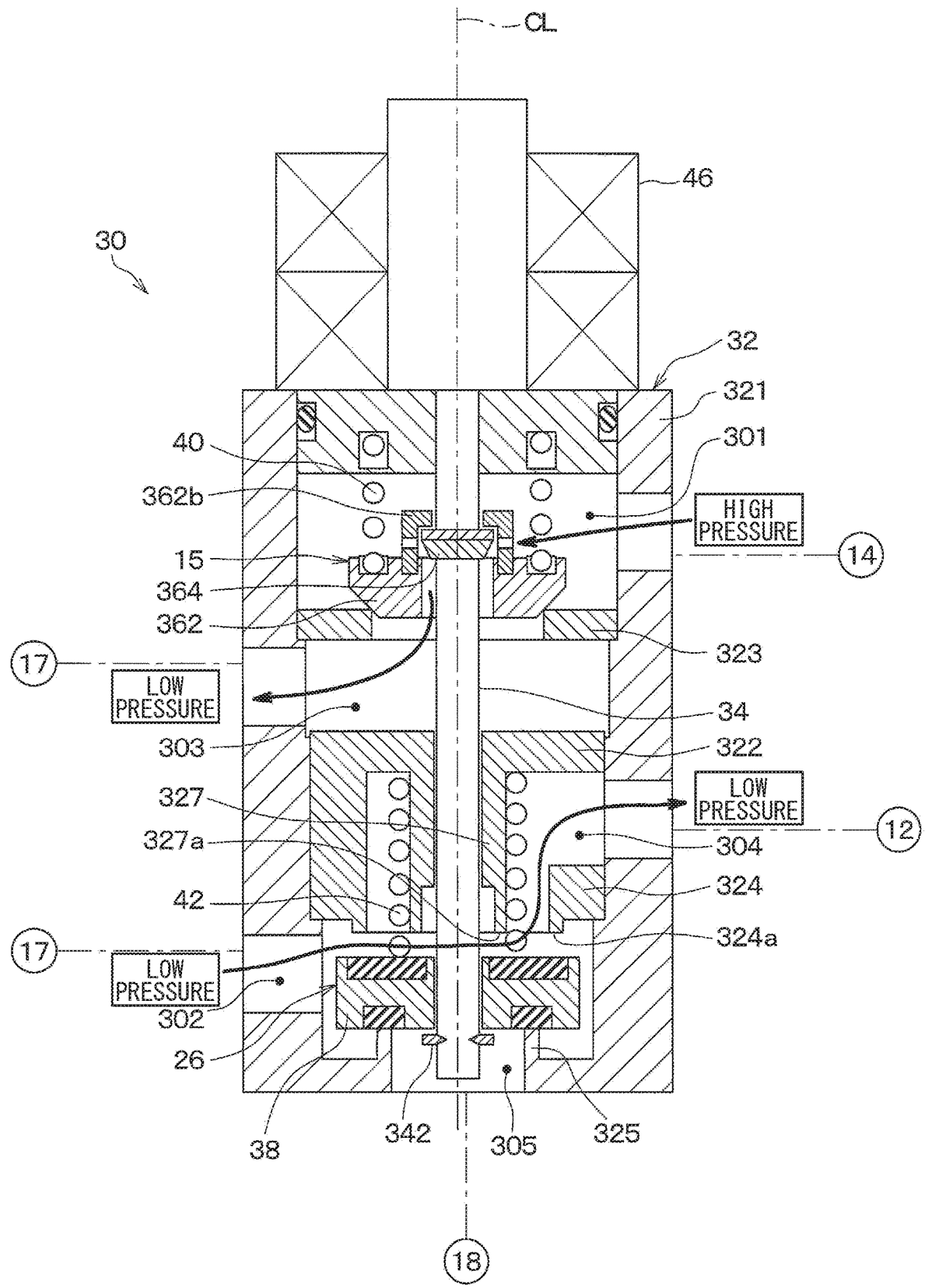
FIG. 11 is a cross-sectional view of the integrated valve device of the second embodiment in the heating mode.

In addition, as shown in FIG. 11, in the heating mode, the second valve body 38 is separated from both the second valve seat 324a and the end portion 327a of the cylindrical portion 327. As a result, the second valve body 38 is set to the first communication state.

OTHER EMBODIMENTS (1) In each embodiment described above, the one side of the integrated valve device 30 in the axial direction AD corresponds to the upper side, and the other side of the integrated valve device 30 in the axial direction AD corresponds to the lower side. However, the upper side and the lower side may be reversed. That is, the integrated valve device 30 of the present disclosure may be installed upside down with respect to the above-described embodiments.

(2) In each of the above-described embodiments, the first valve body 36 includes the main valve body 362 and the sub valve body 364. However, this is not intended to be limiting, and the first valve body 36 may include one valve body only. In this case, the first valve body 36 can be switched between the open state and the throttled state by adjusting the opening degree of the gap passage between the first valve body 36 and the first valve seat 323a.

(3) In each of the above-described embodiments, the liquid receiver 18 is provided between the third outlet passage 305 and the cooling expansion valve 20 of the integrated valve device 30. More precisely, the liquid receiver 18 is connected between the third outlet passage 305 and the subcooling unit 19. However, the liquid receiver 18 may be connected between the core portion 17 and the second inlet passage 302 of the integrated valve device 30 instead.

(4) In each embodiment described above, the integrated valve device 30 of the present disclosure is applied to the heat pump circuit 10. The integrated valve device 30 of the present disclosure is not limited to the heat pump circuit 10 and may be applied to a fluid circulation circuit in which a fluid circulates.

(5) The present disclosure is not limited to the foregoing description of the embodiments and can be modified within the scope of the present disclosure. The present disclosure may also be varied in many ways. Such variations are not to be regarded as departure from the disclosure, and all such modifications are intended to be included within the scope of the disclosure. The above embodiments are not independent of each other, and can be appropriately combined except when the combination is obviously impossible. Individual elements or features of a particular embodiment are not necessarily essential unless it is specifically stated that the elements or the features are essential in the foregoing description, or unless the elements or the features are obviously essential in principle. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Furthermore, a material, a shape, a positional relationship, or the like, if specified in the above described example embodiments, is not necessarily limited to the specific material, shape, positional relationship, or the like unless it is specifically stated that the material, shape, positional relationship, or the like is necessarily the specific material, shape, positional relationship, or the like, or unless the material, shape, positional relationship, or the like is obviously necessary to be the specific material, shape, positional relationship, or the like in principle.

CONCLUSION

According to a first aspect illustrated by one or more of the above described embodiments, an integrated valve device is provided with a body part, a flow rate adjustment valve body, a flow passage switching valve body, and a shaft member.

Further, according to a second aspect, the integrated valve device includes a switching biasing member that biases the flow passage switching valve body in a direction to close the third outlet passage. Since the switching biasing member biases the flow passage switching valve body and the shaft member does not bias the flow passage switching valve body, the flow passage switching valve body is maintained in the first communication state. During the first communication state, due to the shaft member biasing the flow rate adjustment valve body, the flow rate adjustment valve body adjusts the flow rate of a predetermined fluid. Going against the biasing force of the switching biasing member, when the shaft member biases the flow passage switching valve body in the direction of opening the third outlet passage and closing the second outlet passage, the flow passage switching valve body is set to the second communication state.

According to this, the flow rate adjustment valve body is able to adjust the flow rate while the flow passage switching valve body maintains the first communication state.

Further, according to a third aspect, the shaft member has a pressing portion that presses the flow passage switching valve body against the biasing force of the switching biasing member. When the position of the shaft member is within a range for the flow rate adjustment valve body to adjust the flow rate, the pressing portion is separated from the flow passage switching valve body. As a result, the integrated valve device of the second aspect can be implemented.

Further, according to a fourth aspect, the flow rate adjustment valve body is configured to be switchable between an open state in which an opening area of the flow rate adjustment passage between the first inlet passage and the first outlet passage is set to a predetermined size, and a throttled state in which the opening area of the flow rate adjustment passage is smaller than in the open state. Further, the flow rate adjustment valve body is configured to be able to adjust the flow rate of the predetermined fluid by changing the opening area of the flow rate adjustment passage during the throttled state. The shaft member moves the flow rate adjustment valve body along the axial direction of the shaft member. The moving direction of the shaft member for switching the flow rate adjustment valve body from the throttled state to the open state is the same as the moving direction of the shaft member for the flow rate adjustment valve body to increase the flow rate of the predetermined fluid during the throttled state.

As a result, it is easy to control the throttle state and the open state of the flow rate adjustment valve body.

Moreover, according to a fifth aspect, the flow rate adjustment valve body includes a main valve body and a sub valve body. The body portion includes a flow valve seat forming portion that forms a main valve body valve seat with which the main valve body comes into contact with and separates from. The first inlet passage is formed in the body portion on one side in the axial direction of the shaft member relative to the flow valve seat forming portion. The first outlet passage is formed in the body portion on the other side in the axial direction relative to the flow valve seat forming portion. The flow valve seat forming portion is formed with a passage communication hole for communicating the first inlet passage with the first outlet passage. An insertion hole through which the shaft member is inserted is formed in the main valve body. The sub valve body is fixed to the shaft member, and adjusts the opening area of the gap passage formed between the inner wall surface of the insertion hole and the shaft member. The integrated valve device includes a flow rate biasing member that biases the main valve body toward the other side in the axial direction. When the shaft member moves from the other side in the axial direction to the one side in the axial direction and the shaft member biases the main valve body to the one side, the main valve body is separated from the main valve body valve seat. The first inlet passage and the first outlet passage are in communication with each other through the gap between the main valve body and the main valve body valve seat and through the passage communication hole, and the flow rate adjustment passage is set to the open state. When the shaft member moves from the one side in the axial direction to the other side in the axial direction and the shaft member does not bias the main valve body, the biasing member biases the main valve body toward the other side such that the main valve body abuts the main valve body valve seat. The gap between the main valve body and the main valve body valve seat is closed as a result. In this case, the first inlet passage and the first outlet passage are in communication with each other through the passage communication hole and the gap passage, and the flow rate adjustment passage is set to the throttled state. In the throttled state, as the shaft member moves from the one side in the axial direction to the other side in the axial direction, the sub valve body reduces the opening area of the gap passage. As a result, the integrated valve device of the fourth aspect can be implemented.

Further, according to a sixth aspect, the body portion includes a partition portion that partitions the inside of the body portion into a space on the first outlet passage side including the first outlet passage and a space on the second outlet passage side including the second outlet passage. An insertion hole through which the shaft member is inserted is formed in the partition portion. The integrated valve device includes a sealing member that seals a gap between the inner wall surface of the insertion hole of the partition portion and the shaft member while allowing the shaft member to slide.

As a result, it is possible to prevent the predetermined fluid that flows through the first outlet passage from flowing into the second outlet passage from the gap between the inner wall surface of the insertion hole of the partition portion and the shaft member.

Further, according to a seventh aspect, the body portion includes the partition portion and the switching valve seat forming portion. The partition portion partitions the inside of the body portion into the space on the first outlet passage side including the first outlet passage and the space on the second outlet passage side including the second outlet passage. The switching valve seat forming portion is disposed on the partition portion side of the flow passage switching valve body in the space on the second outlet passage side. The switching valve seat forming portion forms the switching valve seat of the flow passage switching valve body, with which the partition portion comes into contact with and separates from. The second outlet passage is formed between the switching valve seat forming portion and the partition portion in the space on the second outlet passage side. An insertion hole through which the shaft member is inserted is formed in the partition portion. The shaft member extends from the flow rate adjustment valve body toward the flow passage switching valve body through the insertion hole of the partition portion. The partition portion has the cylindrical portion extending from the peripheral portion of the insertion hole toward the flow passage switching valve body. The shaft member is inserted into the cylindrical portion. When the flow passage switching valve body comes into contact with the switching valve seat and closes the second outlet passage, the end of the cylindrical portion facing the flow passage switching valve body comes into contact with the flow passage switching valve body.

According to this, when the flow passage switching valve body is in the second communication state which closes the second outlet passage, it is possible to prevent the predetermined fluid that flows through the first outlet passage from flowing into the second outlet passage from the gap between the inner wall surface of the insertion hole of the partition portion and the shaft member.

Further, according to an eighth aspect, the fluid circulation circuit is a heat pump circuit in which a refrigerant circulates as the predetermined fluid. The heat pump circuit includes a compressor, a radiator, a heat exchanger, an expansion valve, and an evaporator. The first inlet passage is connected to a flow passage into which the refrigerant flowing out of the radiator flows. The first outlet passage is connected to a flow passage that guides the refrigerant to the heat exchanger.

The second inlet passage is connected to a flow passage into which the refrigerant flowing out of the heat exchanger flows. The second outlet passage is connected to a flow passage that bypasses the expansion valve and the evaporator and guides the refrigerant to the compressor. The third outlet passage is connected to a flow passage that guides the refrigerant which had flowed through the expansion valve then the evaporator to the compressor.

As in the eighth aspect, the integrated valve device can be applied to the heat pump circuit. Due to this, it is possible to switch between a heating mode and a cooling mode.

The invention claimed is:

1. An integrated valve device for a fluid circulation circuit through which a predetermined fluid circulates, comprising:
    a body portion having formed therein a first inlet passage and a second inlet passage into which the predetermined fluid flows, and a first outlet passage, a second outlet passage and a third outlet passage through which the predetermined fluid flows out;
    a flow rate adjustment valve body provided inside the body portion that adjusts a flow rate of fluid flowing from the first inlet passage to the first outlet passage;
    a flow passage switching valve body provided inside the body portion configured to switch a flow path of the predetermined fluid in the fluid circulation circuit, the flow passage switching valve body being switchable between a first communication state that allows communication between the second inlet passage and the second outlet passage while closing the third outlet passage, and a second communication state that allows communication between the second inlet passage and the third outlet passage while closing the second outlet passage;
    a shaft member provided inside the body portion that interlocks the flow rate adjustment valve body and the flow passage switching valve body; and
    a switching biasing member that biases the flow passage switching valve body in a direction to close the third outlet passage, wherein
    the flow passage switching valve body is maintained in the first communication state when the switching biasing member biases the flow passage switching valve body and the shaft member does not bias the flow passage switching valve body,
    the flow rate adjustment valve body is configured to adjust the flow rate of the predetermined fluid during the first communication state due to the flow rate adjustment valve body being biased by the shaft member, and
    the flow passage switching valve body is set to the second communication state when, going against the biasing force of the switching biasing member, the shaft member biases the flow passage switching valve body in a direction of opening the third outlet passage and closing the second outlet passage.

2. The integrated valve device of claim 1, wherein
    the shaft member includes a pressing portion that presses the flow passage switching valve body against the biasing force of the switching biasing member, and
    when a position of the shaft member is within a range for the flow rate adjustment valve body to adjust the flow rate, the pressing portion is separated from the flow passage switching valve body.

3. The integrated valve device of claim 1, wherein
    the body portion includes a partition portion that partitions an inside of the body portion into a space on a first outlet passage side including the first outlet passage and a space on a second outlet passage side including the second outlet passage,
    an insertion hole, through which the shaft member is inserted, is formed in the partition portion, and
    the integrated valve device further comprises a sealing member that seals a gap between an inner wall surface of the insertion hole of the partition portion and the shaft member while allowing the shaft member to slide.

4. The integrated valve device of claim 1, wherein
    the fluid circulation circuit is a heat pump circuit in which a refrigerant circulates as the predetermined fluid,
    the heat pump circuit includes:
    a compressor that sucks in, compresses, and discharges the refrigerant,
    a radiator that dissipates heat from the refrigerant discharged from the compressor,
    a heat exchanger that exchanges heat between the refrigerant and a heat medium other than the refrigerant,
    an expansion valve that decompresses and expands the refrigerant flowing out of the heat exchanger, and an evaporator that causes the refrigerant decompressed and expanded by the expansion valve to evaporate, the first inlet passage is connected to a flow passage into which the refrigerant flowing out of the radiator flows, the first outlet passage is connected to a flow passage that guides the refrigerant to the heat exchanger, the second inlet passage is connected to a flow passage into which the refrigerant flowing out of the heat exchanger flows, the second outlet passage is connected to a flow passage that bypasses the expansion valve and the evaporator and guides the refrigerant to the compressor, and the third outlet passage is connected to a flow passage that guides the refrigerant, having flowed through the expansion valve and then the evaporator, to the compressor.

5. The integrated valve device of claim 1, wherein the flow rate adjustment valve body is configured to be switchable between an open state in which an opening area of a flow rate adjustment passage between the first inlet passage and the first outlet passage is set to a predetermined size, and a throttled state in which the opening area of the flow rate adjustment passage is smaller than in the open state, the flow rate adjustment valve body is further configured to be capable of adjusting the flow rate of the predetermined fluid during the throttled state by varying an opening area of the flow rate adjustment passage, the shaft member is configured to move the flow rate adjustment valve body along an axial direction of the shaft member, and a moving direction of the shaft member for switching the flow rate adjustment valve body from the throttled state to the open state is the same as a moving direction of the shaft member for the flow rate adjustment valve body to increase the flow rate of the predetermined fluid during the throttled state.

6. The integrated valve device of claim 5, wherein the flow rate adjustment valve body includes a main valve body and a sub valve body, the body portion includes a flow valve seat forming portion that forms a main valve body valve seat with which the main valve body comes into contact with and separates from, the first inlet passage is formed in the body portion on one side in the axial direction of the shaft member relative to the flow valve seat forming portion, the first outlet passage is formed in the body portion on an other side in the axial direction relative to the flow valve seat forming portion, the flow valve seat forming portion is formed with a passage communication hole for communicating the first inlet passage with the first outlet passage, an insertion hole, through which the shaft member is inserted, is formed in the main valve body, the sub valve body is fixed to the shaft member, and adjusts the opening area of a gap passage formed between an inner wall surface of the insertion hole and the shaft member, the integrated valve device further comprises a flow rate biasing member that biases the main valve body toward the other side in the axial direction, the flow rate adjustment passage is set to the open state when the shaft member moves from the other side in the axial direction to the one side in the axial direction and the shaft member biases the main valve body to the one side, whereby the main valve body is separated from the main valve body valve seat such that the first inlet passage and the first outlet passage are in communication with each other through a gap between the main valve body and the main valve body valve seat and through the passage communication hole, the flow rate adjustment passage is set to the throttled state when the shaft member moves from the one side in the axial direction to the other side in the axial direction and the shaft member does not bias the main valve body while the biasing member biases the main valve body toward the other side, whereby the main valve body abuts the main valve body valve seat such that the gap between the main valve body and the main valve body valve seat is closed such that the first inlet passage and the first outlet passage are in communication with each other through the passage communication hole and the gap passage, and in the throttled state, as the shaft member moves from the one side in the axial direction to the other side in the axial direction, the sub valve body reduces an opening area of the gap passage.

7. An integrated valve device for a fluid circulation circuit through which a predetermined fluid circulates, comprising:

a body portion having formed therein a first inlet passage and a second inlet passage into which the predetermined fluid flows, and a first outlet passage, a second outlet passage and a third outlet passage through which the predetermined fluid flows out;

a flow rate adjustment valve body provided inside the body portion that adjusts a flow rate of fluid flowing from the first inlet passage to the first outlet passage;

a flow passage switching valve body provided inside the body portion configured to switch a flow path of the predetermined fluid in the fluid circulation circuit, the flow passage switching valve body being switchable between a first communication state that allows communication between the second inlet passage and the second outlet passage while closing the third outlet passage, and a second communication state that allows communication between the second inlet passage and the third outlet passage while closing the second outlet passage; and a shaft member provided inside the body portion that interlocks the flow rate adjustment valve body and the flow passage switching valve body, wherein the body portion includes:

a partition portion that partitions an inside of the body portion into a space on a first outlet passage side including the first outlet passage and a space on a second outlet passage side including the second outlet passage, a switching valve seat forming portion disposed on a partition portion side of the flow passage switching valve body in the space on the second outlet passage side, the switching valve seat forming portion forms a switching valve seat which comes into contact with and separates from the flow passage switching valve body, the second outlet passage is formed between the switching valve seat forming portion and the partition portion in the space on the second outlet passage side, an insertion hole, through which the shaft member is inserted, is formed in the partition portion, and the shaft member extends from the flow rate adjustment valve body toward the flow passage switching valve body through the insertion hole of the partition portion, the partition portion includes a cylindrical portion extending from a peripheral portion of the insertion hole toward the flow passage switching valve body, the shaft member is inserted through the cylindrical portion, and when the flow passage switching valve body is abutting the switching valve seat to close the second outlet passage, an end portion of the cylindrical portion facing the flow passage switching valve body is in abutment with the flow passage switching valve body.

8. An integrated valve device, comprising:

a housing having formed therein a first inlet passage, a second inlet passage, a first outlet passage, a second outlet passage, and a third outlet passage;

an expansion valve provided inside the housing, the expansion valve including a first valve element which is movable to adjust a flow rate of a fluid flowing from the first inlet passage to the first outlet passage;

a three-way valve provided inside the housing configured to switch a flow path of the fluid within the housing, the three-way valve including a second valve element which is movable between a first communication state that allows communication between the second inlet passage and the second outlet passage while closing the third outlet passage, and a second communication state that allows communication between the second inlet passage and the third outlet passage while closing the second outlet passage; and a shaft provided inside the housing configured to be movable to displace both the first valve element and the second valve element.

* * * * *